(12) United States Patent
Ehrnberg

(10) Patent No.: US 9,175,665 B2
(45) Date of Patent: Nov. 3, 2015

(54) METHOD OF EXTRACTING ENERGY FROM WAVE MOTION IN A FLUID

(75) Inventor: Daniel Ehrnberg, Göteborg (SE)

(73) Assignee: Vigor Wave Energy AB, Gothenburg (SE)

( * ) Notice: Subject to any disclaimer, the term of this patent is extended or adjusted under 35 U.S.C. 154(b) by 1645 days.

(21) Appl. No.: 12/448,963

(22) PCT Filed: Jan. 17, 2008

(86) PCT No.: PCT/SE2008/050053
§ 371 (c)(1),
(2), (4) Date: Jul. 16, 2009

(87) PCT Pub. No.: WO2008/091208
PCT Pub. Date: Jul. 31, 2008

(65) Prior Publication Data
US 2010/0066084 A1  Mar. 18, 2010

(30) Foreign Application Priority Data
Jan. 22, 2007  (SE) ...................................... 0700124

(51) Int. Cl.
*H02P 9/04* (2006.01)
*F03B 13/20* (2006.01)
*F03B 13/18* (2006.01)
*F03B 13/14* (2006.01)

(52) U.S. Cl.
CPC ............... *F03B 13/20* (2013.10); *F03B 13/148* (2013.01); *F03B 13/188* (2013.01); *F05B 2240/93* (2013.01); *Y02E 10/38* (2013.01)

(58) Field of Classification Search
USPC ............ 290/42, 43, 53, 54; 60/496–498, 502; 415/331–333
See application file for complete search history.

(56) References Cited

U.S. PATENT DOCUMENTS 2,962,599 A * 11/1960 Pirkey ............................ 290/4 R
3,939,356 A *  2/1976 Loane ............................. 290/52
(Continued)

FOREIGN PATENT DOCUMENTS

| GB | 2 024 957 A |   | 1/1980 |
| JP | 03078569 A | * | 4/1991 |

(Continued)

OTHER PUBLICATIONS

English translation of JP 03078569 A document.*

*Primary Examiner* — Tulsidas C Patel
*Assistant Examiner* — Julio Gonzalez
(74) *Attorney, Agent, or Firm* — Babcock IP, PLLC

(57) ABSTRACT

A wave-power aggregate and a method of extracting energy from wave motion in a liquid by means of a wave-power aggregate is provided. The wave-power aggregate comprises a container which is situated at least partially in the liquid and also comprises an inflow and an outflow. The container is arranged to, under the influence of said wave motion, to let a first part of the container arrange itself in a first position and a second part of the container in a second position, where the first and second position corresponds to different potential energy states. The method comprises the steps of: alternately supplying the container with at least a first and a second fluid respectively via the inflow, where the density of the fluids differs; and at least during an initial stage of the method controlling a flow resistance in at least one of the first and second fluids through the container.

8 Claims, 11 Drawing Sheets

(56) References Cited

U.S. PATENT DOCUMENTS

| | | | | |
|---|---|---|---|---|
| 4,031,702 A | * | 6/1977 | Burnett et al. | 60/398 |
| 4,055,950 A | * | 11/1977 | Grossman | 60/398 |
| 4,098,081 A | * | 7/1978 | Woodman | 60/398 |
| 4,159,188 A | * | 6/1979 | Atencio | 405/78 |
| 4,321,475 A | * | 3/1982 | Grub | 290/52 |
| 4,327,296 A | * | 4/1982 | Weyers | 290/53 |
| 4,398,095 A | * | 8/1983 | Ono | 290/53 |
| 4,443,708 A | * | 4/1984 | Lapeyre | 290/53 |
| 4,782,663 A | * | 11/1988 | Bellamy | 60/398 |
| 5,377,485 A | * | 1/1995 | Bellamy | 60/398 |
| 5,551,237 A | * | 9/1996 | Johnson | 60/641.8 |
| 6,439,854 B1 | * | 8/2002 | Skaarup | 417/53 |
| 6,476,511 B1 | | 11/2002 | Yemm et al. | |
| 7,299,628 B2 | * | 11/2007 | Buller | 60/398 |
| 7,804,182 B2 | * | 9/2010 | DeAngeles | 290/43 |
| 2007/0214780 A1 | * | 9/2007 | Walters | 60/398 |

FOREIGN PATENT DOCUMENTS

| | | |
|---|---|---|
| SU | 1129407 A | 12/1984 |
| WO | WO 2006/067421 A1 | 6/2006 |

* cited by examiner

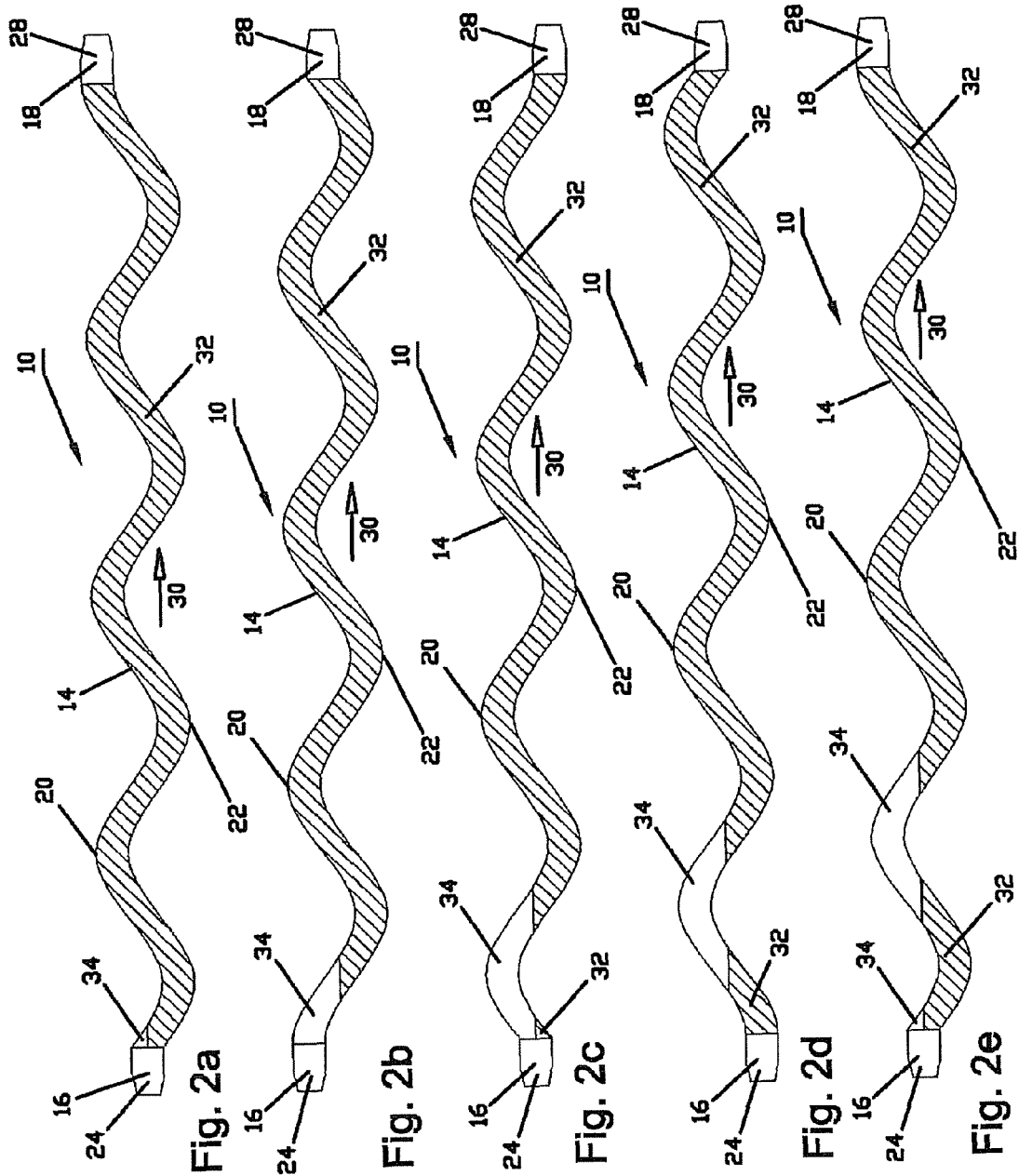

METHOD OF EXTRACTING ENERGY FROM WAVE MOTION IN A FLUID

CROSS-REFERENCE TO RELATED APPLICATIONS

This application is a U.S. national phase application claiming priority from PCT/SE2008/050053 filed 17 Jan. 2008, which claims priority from SE 0700124-1, filed 22 Jan. 2007.

TECHNICAL AREA

The present invention relates to a method which extracts energy from wave motion in a fluid by means of a wave-power aggregate. The wave-power aggregate comprises a container which is situated, at least partially, in said fluid and comprises an inflow and an outflow. The container is constructed so that under the influence of said wave motion, the first part of the container arranges itself in a first position, and the second part of the container in a second position, where as the first and second position correspond to different potential energy states.

The present invention relates to a wave-power aggregate by which the method according to the invention can be carried out and also the use of such aggregates.

INVENTION BACKGROUND

Wave energy, a concentrated form of renewable energy, has many possibilities for supplying energy in an environmentally friendly way. The extraction of wave energy has, at present been left nearly unexploited. This is mostly due to flaws in earlier wave-power plants used to extract this resource. These wave-power plants have often had low efficiency and are often subjected to operational disturbances and damage when exposed to extreme weather conditions.

U.S. Pat. No. 6,476,511 B1 describes a wave-power aggregate consisting of a number of displaced cylinders which are connected in succession by means of hydraulic systems. The hydraulic systems are arranged to extract energy when the adherent cylinders move in proportion to each other due to wave motion. It is understood that the above mentioned aggregate comprises a number of movable parts, such as the hydraulic systems, which result in aggregates of this kind being sensitive to operational disturbance due to for example corrosion or bad weather conditions.

Furthermore GB 2 024 957 A shows a wave-power aggregate which comprises a number of pipes organized into a raft floating on a water surface and adjusting to wave motion at the surface. The volume of the pipes is arranged to vary when the pipes are stretched, or contracted when the raft moves due to wave motion. In addition, every pipe has one-way valves which makes it possible for water to be pumped through each pipe.

In addition to the above, Offshore Wave Energy Limited has a wave-power aggregate which comprises a container arranged to be placed at sea or lake-water surfaces. When a wave approaches the container, air originating from a trough of sea water will be trapped in the container and pressurized when a following wave crest, covering the opening of the container, travels through the container. The container tails away in the propagation direction of the wave in order to further compress the air. The compressed air can in a later stage for example be converted into electrical energy by means of a generator. The above mentioned aggregate has however certain limitations among others the aggregate cannot utilize energy over an area larger than the opening of the aggregate.

From the exposition above, it is understood that there is a need for developing improved methods and aggregates for extracting energy from wave motion.

SUMMARY OF THE INVENTION

A first proposal for the present invention provides a method for extracting energy from wave motion that can be used for a broad variety of sea conditions.

A second proposal for the present invention is to supply a method for extracting energy from wave motion using environmentally friendly materials.

A third proposal for the present invention is to supply a method for extracting energy from wave motion with high efficiency.

A fourth proposal for the present invention is to supply a method for extracting energy from wave motion which can be used on a wave-power aggregate that consists of as few parts as possible which can be subjected to as few outer influences as possible such as environmental loads and corrosion.

A fifth proposal for the present invention is to supply a method for extracting energy from wave motion which can be used on a wave-power aggregate that consists of as few inter-movable parts as possible.

At least one of the above proposals may be used in a method for extracting energy from wave motion of a liquid.

Consequently, the invention relates to a method for extracting energy from wave motion in a fluid by means of a wave-power aggregate. The wave-power aggregate comprises a container which is situated, at least partially, in the fluid and also comprises an inflow and an outflow. The container is constructed to, under the influence of wave motion; to let a first part of the container to arrange itself in a first position and a second stage of the container in a second position, where the first and second positions correspond to different potential energy states. The method according to the invention includes the steps to:
 alternately supply the container with at least a first and a second fluid respectively via the inflow, where the density of the first fluid differs from the density of the second fluid; and
 at least during an initial stage of the above method, flow speed control in at least one of the first and second fluids through the container is achieved.

By using the method according to the invention, an increase of pressure and/or the rate of flow of the fluids can be obtained when the fluids have been transported through the container, this increase of pressure and/or flow rate subsequently can be converted into a form of energy that is easier to handle and/or can be stored in for example a reservoir.

In one embodiment, the method further comprises the step to regulate a flow resistance for at least one of the first and second fluids in the container. In this way an accumulated increase in the pressure of the fluids can be obtained through the container. This increase of pressure can later be used to extract energy.

In a further embodiment of the invention, the flow resistance is applied at the outflow. In this way a longer distance is obtained, over which the increase of pressure of the fluids can be accumulated in this container.

In an additional embodiment of the invention, the container has an extension, in an extension direction, between the inflow and the outflow and the method further comprises the step to control the flow speed in the extension direction on the extension, such as, it essentially corresponds to the propagation speed of the wave motion in the extension direction.

In another embodiment of the invention, the method further comprises the step of utilizing energy that is transferred from the wave motion to the container in the form of an increase of pressure and/or flow rate in at least one of the first and second fluids by the outflow and/or the inflow of said fluids In an additional embodiment of the invention, the utilization of the energy is carried out at least partially by means of a conversion means to convert an increase of pressure and/or rate of flow in at least one of the first and second fluids into usable energy, preferably electrical energy, whose conversion means is connected to the outflow and/or the inflow of said fluids.

In another embodiment of the invention, the control of the flow speed of at least one of the first and second fluids and/or the regulation of the flow resistance through the container is carried out by means of the conversion means. This reduces the number of components in the aggregate, which is an obvious advantage.

In an additional embodiment of the invention, the utilization of energy is carried out at least partially by way of at least one of the first and second fluids being transported to a reservoir situated in a position with higher potential energy than the outflow. This allows a simple storing of energy which can be used later on when needed.

In another embodiment of the invention, the method further comprises the step of separating the first fluid from the second fluid when the fluids have been moved from the inflow to the outflow.

In an additional embodiment of the invention, the method further comprises the step of bringing back the second fluid from the outflow to the inflow. In this way it is not necessary to continuously supply new amounts of the second fluid to the aggregate.

In another embodiment of the invention, the wave-power aggregate further comprises a second fluid pipe which connects the outflow and the inflow, where the method further comprises the step of bringing back the second fluid from the outflow to the inflow via the second fluid pipe.

In another embodiment of the invention, the density of the first fluid is more than 10 times higher, preferably more than 100 times higher, and even exceeds 500 times higher, than the density of the second fluid.

In an additional embodiment of the invention, the first fluid is a liquid and the second fluid is a gas.

In another embodiment of the invention, the second fluid is air. The advantage is that air is not bad for the environment and the environmental consequences would thus be mild should the aggregate for any reason be damaged and air should leak out from the aggregate.

In an additional embodiment of the invention, the first fluid is the liquid from which the wave energy is extracted. As with the air, this provides an advantage from an environmental perspective.

In another embodiment of the invention, the inflow is in fluid communication with the liquid from which the wave energy is extracted and the first fluid is taken from the liquid surrounding the inflow.

In an additional embodiment of the invention the outflow is in fluid communication with the liquid from which the wave energy is extracted, where the first fluid is released to the liquid when the first fluid has been moved from the inflow to said outflow of the container. The advantage is that said embodiment eliminates the need to transport the first fluid outside the container of the aggregate.

In another embodiment of the invention, the extension direction forms an angle with the propagation direction of the wave motion, whereas said method further comprises the step of adjusting the angle in order to influence the extraction of potential of potential energy from said container.

In an additional embodiment of the invention, the container includes a flexible hose.

In another embodiment of the invention, the container is arranged to be situated at least partially at the surface of the liquid from which the wave energy is extracted.

In an additional embodiment of the invention, the wave-power aggregate comprises a number of containers, of which each and every one comprises an inflow and an outflow respectively, where energy is extracted from each and every one of the containers.

In another embodiment of the invention, the container in an operational state is arranged at a first distance from the surface of the liquid from which the wave energy is extracted and the method further comprises the step where as, when the wave height of the waves exceeds a predetermined value, the container is moved to a secure position, whereas the container is situated at a second distance from the surface that exceeds the first distance.

A second aspect of the invention relates to a wave-power aggregate, with which the method according to the invention can be carried out.

Thus the second aspect of the invention relates to a wave-power aggregate used to extract energy from wave motion in a liquid. The aggregate comprises a container intended to at least partially be placed in the liquid and that is equipped with an inflow and also an outflow. The container comprises a first and a second part which are arranged to be influenced by the wave motion so that the parts, at least at times when under said influence, are situated in positions with different potential energy relatively to each other. In accordance with the invention the aggregate comprises: a fluid supply means arranged to alternately supply a first and also a second fluid to the container and also a control unit arranged to control the fluid supply means, and a control gear arranged to at least initially control a fluid speed in at least one of the first and second fluids through said container.

In one embodiment of the aggregate according to the invention, the control gear is further arranged to regulate a flow resistance through said container.

In one embodiment of the aggregate according to the invention, the wave-power aggregate further comprises anchoring means adjusted to connect the wave-power aggregate with at least one anchor point.

In an additional embodiment of the aggregate according to the invention, the anchorage means is intended to connect the wave-power aggregate to a bottom which at least partially delimits the liquid from which wave energy is extracted.

In another embodiment of the aggregate according to the invention, the wave-power aggregate further comprises a second fluid pipe which connects the inflow and the outflow.

In an additional embodiment of the aggregate according to the invention, the second fluid pipe is at least partially connected to the container.

In another embodiment of the aggregate according to the invention, the aggregate further comprises conversion means, which are connected to the outflow and/or the inflow and also arranged to convert an increase of pressure and/or flow rate in at least one of the first and second fluids into useable energy, preferably electrical energy.

In an additional embodiment of the aggregate according to the invention, the aggregate further comprises a fluid separator arranged to separate at least the first and second fluids, said separator being in fluid communication with the outflow.

In another embodiment of the aggregate according to the invention, the aggregate comprises a number of containers.

In an additional embodiment of the aggregate according to the invention, the container is made of a rigid material.

In another embodiment of the aggregate according to the invention, the center of the cross-section of the inflow and the outflow is situated on an extension line and the container has a center line that runs from the inflow to the outflow along the center of the cross-section of the container, where said container comprises a part at which the center line is situated at a distance from the extension line.

In an additional embodiment of the aggregate according to the invention, the container comprises a number of parts, at which the center line is situated at a distance from the extension line.

In another embodiment of the aggregate according to the invention, the container comprises a flexible hose.

A third aspect of the invention relates to the use of the wave-power aggregate according to the invention.

A SHORT DESCRIPTION OF THE DRAWINGS

The present invention will be explained below by means of non-limiting examples with reference to the accompanying drawings, in which:

FIGS. 2a-2j show cross-sections of an embodiment of the wave-power aggregate according to the present invention, where the different steps in the method of the invention are described;

DETAILED DESCRIPTION OF THE PREFERRED EMBODIMENTS

The invention will be described by means of examples of embodiments. It should nevertheless be understood that these embodiments only serve to elucidate the present invention, whose extent of protection is limited by the following claims.

Figure 1:
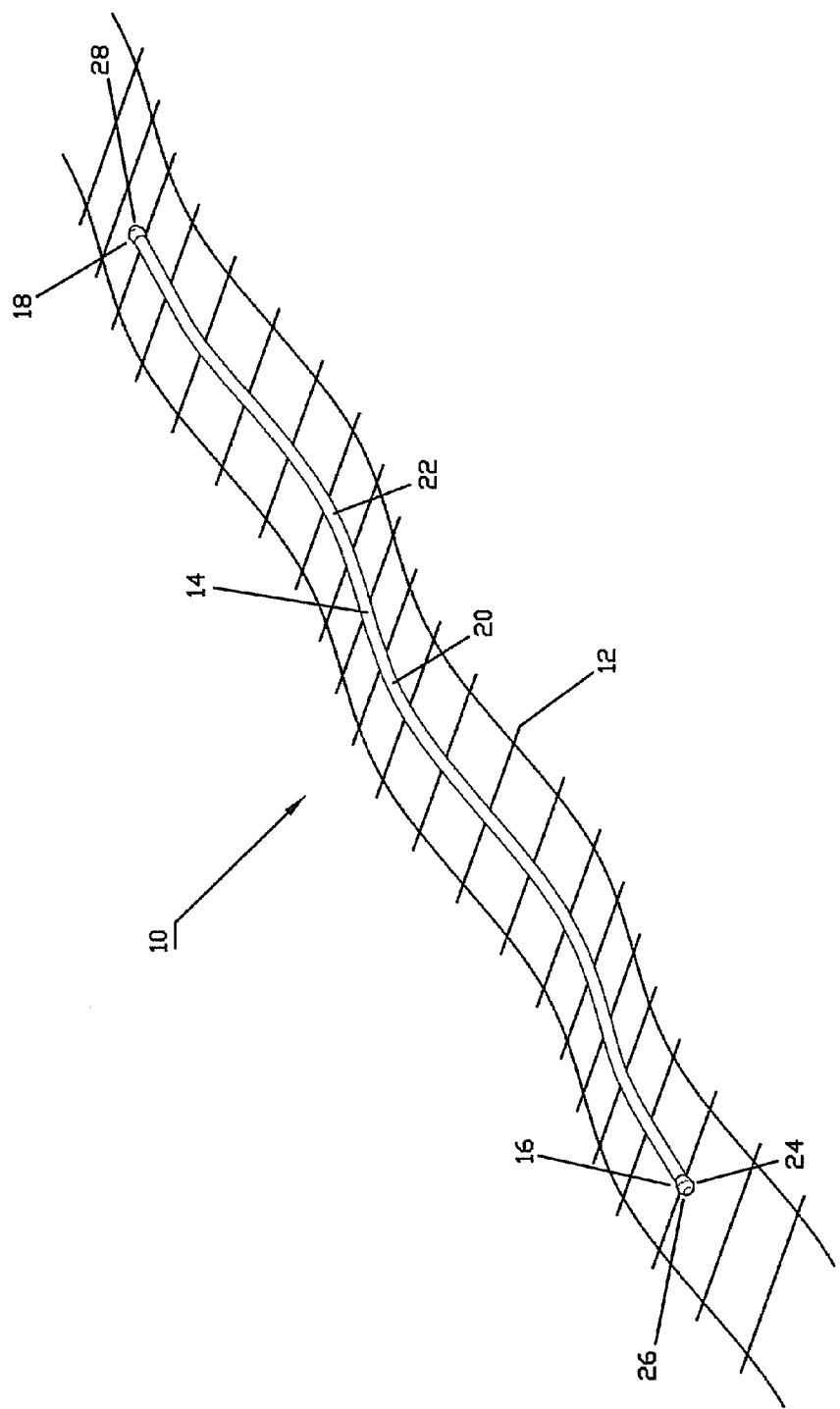
FIG. 1 shows a schematic side view of an example of a wave-power aggregate according to the present invention.

FIG. 1 schematically shows a wave-power aggregate 10 according to the present invention intended to extract energy from wave motion in a liquid 12. The aggregate 10 comprises a container 14 intended to at least partially be placed in the liquid 12 and that is equipped with an inflow 16 and also an outflow 18. The container 14 in FIG. 1 comprises a first and second part 20, 22 which are arranged to be influenced by the wave motion so that they, at least at times when influenced, are situated in positions with different potential energy states relative to each other. This is obtained in the embodiment shown in FIG. 1 by designing the container 14 as a flexible hose which at least partially is situated at the surface of the liquid 12 and with that essentially assuming the same shape as the wave pattern on the surface (shown schematically in FIG. 1), which is a preferred design of the container 14. It should nevertheless be understood that the quality to have a first and second part that are arranged to be situated in positions with different potential energy can be obtained in a number of different ways, which will be illustrated in connection with alternative embodiments below.

The wave-power aggregate 10 is used preferably in seas or lakes, but could of course also be used for example in a basin filled with a liquid other than water.

Wave-power aggregate 10 comprises a fluid supply means 24 arranged to alternately supply a first and also a second fluid to the container 14 and also a control unit 26 arranged to, when needed, to be able to control the fluid supply means 24. Both the fluid supply means 24 and the control unit 26 are illustrated only schematically in FIG. 1 and are situated at the inflow 16 to the container 14. However, other arrangements of both the fluid supply means 24 and the control unit 26 can be considered.

The fluid supply means 24 can be designed in a number of ways, as long as it is arranged to alternately supply at least a first and a second fluid to the container 14. The fluid supply means 24 could for example consist of one or more fluid sources (not shown) and also one or more valves (not shown) to control the influx of each fluid into the container 14.

Furthermore the wave-power aggregate 10 includes a control gear 28 which is arranged to initially control fluid speed in at least one of the first and second fluids flowing through the container 14, and also preferably regulate flow resistance through the container 14. In the embodiment shown in FIG. 1 the control gear 28 is arranged by the outflow 18 of the container, but the control gear 28 could also be placed at the inflow 16 or between the inflow 16 and the outflow 18 of the container 14. Furthermore it is possible to divide the control gear into a first part (not shown) controlling the fluid speed and a second pert (not shown) regulating a flow resistance through the container by arranging these two parts separately from each other.

Furthermore the control gear 28 can comprise a turbine, with which the flow speed through the container 14 can be controlled and the flow resistance through the container 14 regulated. It is however possible to design the control gear 28 in a different way, for example by means of throttle valves (not shown) by the outflow 18, inflow 16 and/or in the container 14, such that the flow speed and/or the flow resistance through the container 14 is controlled by way of varying the position of the inflow 16 and/or the outflow 18 so that the difference in positional energy between the inflow 16 and the outflow 18 is varied also bearing in mind that a combination of the above mentioned solutions can also form part of the control gear 28. In addition, the control gear 28 can be fitted at the inflow 16 of the container 14, in order to, for example, control the flow speed as a function of the sea state.

Figures 2F, 2G, 2H, 2I, 2J:
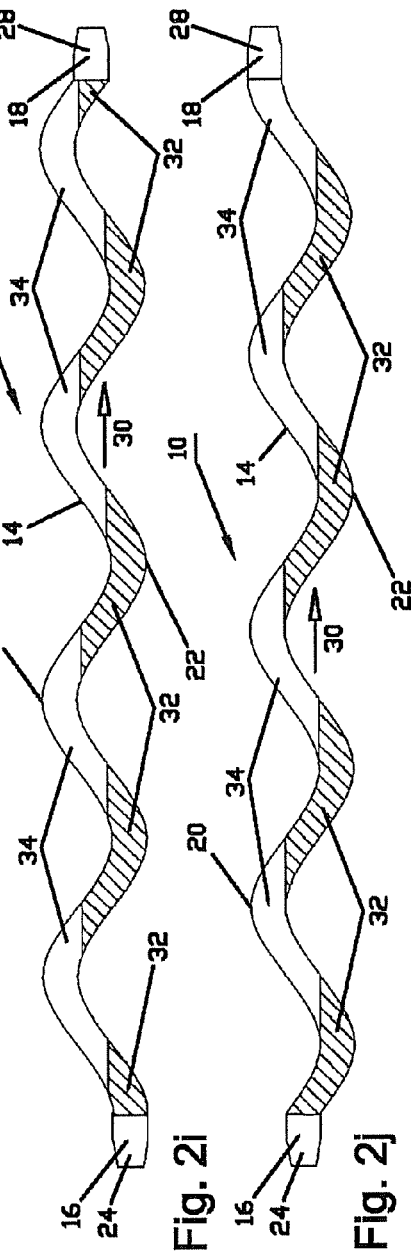

The method according to the present invention to extract energy from wave motion in a liquid 12 by means of a wave-power aggregate 10 will now be shown in relation to FIG. 2a-FIG. 2j and FIG. 3. FIG. 2a shows a longitudinal cross-section of a wave-power aggregate 10 in which the container 14 is influenced by waves alongside the extension direction 30 of the container 14. Thus the waves move from left to right in FIG. 2a-FIG. 2j. The container 14 in FIG. 2a contains a first fluid 32, which is illustrated with dashed areas, and also a second fluid 34. In the example shown in FIG. 2a-2j and FIG. 3, the first fluid 32 has a higher density than the second fluid 34. As previously mentioned, the container 14 is arranged to, under the influence of the wave motion, let a first part 20 of the container arrange itself in a first position and a second part of the container 22 in a second position, where the first and second positions correspond to different potential energy states. In the example shown in FIG. 2a-2j, the first position corresponds to a higher potential energy state than the second position.

The container 14 of the wave-power aggregate 10 in FIG. 2a is for the most part filled with the first fluid 32. In the example shown in FIG. 2a-FIG. 2j the container 14 extends in an extension direction 30 between the inflow 16 and the outflow 18 and the flow speed through the container 14 is controlled such that the speed in the extension direction 30 essentially corresponds to the propagation speed of the wave motion in the extension direction 30. In order to produce this regulation of the flow speed correctly, the wave-power aggregate can preferably be connected with an arrangement that measures the wave motion. This arrangement for example can includes a wave radar and/or a wave buoy with the intention of receiving information about the propagation direction and speed of the waves.

Another possibility is that the flow speed of the first fluid is controlled such that it instead, for example, corresponds instead to a multiple of the propagation speed of the waves. Furthermore it is possible that the control of the flow speed does not take place until the container 14 is filled with both the first and second fluids 32, 34. As previously mentioned the control of the flow speed takes place by means of the control gear 28 which is shown schematically in FIG. 2a. Furthermore in FIG. 2a it is shown that a certain amount of the second fluid 34 has been supplied to the container 14 through the fluid supply means 24 which is shown schematically in FIG. 2a.

FIG. 2b shows the wave-power aggregate 10 in one time stage later than FIG. 2a. By now a greater amount of the second fluid 34 has been supplied while the flow speed through the container 14 is essentially maintained.

FIG. 2c shows the wave-power aggregate 10 in yet a later time stage. The first fluid 32 is now once again supplied to the container 14.

FIG. 2d shows the wave-power aggregate 10 in yet a later time stage. The first fluid 32 is still supplied to the container 14 with the flow speed essentially maintained.

FIG. 2e shows the wave-power aggregate 10 in yet a later time stage, which corresponds to the time of one wave period later than in FIG. 2a. Again, the second fluid is being supplied to the container 34.

The process shown in FIG. 2a-FIG. 2e is repeated until the container is completely filled alternately with sections of the first and the second fluid 32, 34 respectively as shown in FIG. 2f.

When this situation is reached, the fluids 32, 34 themselves can maintain their speed through the container. Consequently it is no longer necessary to use the control gear 28 in order to control the flow speed of the fluids 32, 34 through the container 14 since the fluids 32, 34 will displace one another with as low potential energy as possible. This means that the fluids 32, 34 by displacing one another in different parts of the container 14 provides a means by which a fluid with higher density readily will fill the lower portions while a lighter fluid will be pushed aside and fill the higher portions, each contributing to maintaining the flow speed through the container 14. Thus, the fluids 32, 34 in the container 14 are close to a state of equilibrium in which the two adjacent end surfaces of every part with the first and second fluids 32, 34 are situated on essentially the same level. With the wave-power aggregate 10 is in this position, the aggregate will thus produce a flow of the fluids 32, 34 with a flow speed which is essentially a function of the propagation speed of the waves. Consequently the aggregate 10 can be used as a pump by virtue of the relative position of the two fluids within itself.

FIG. 2g shows the wave-power aggregate 10 in a time stage later than in FIG. 2f. A flow resistance through the container 14 has now been regulated, in this case increased. In the example shown in FIG. 2g this flow resistance has been applied at the outflow 18 of the container 14 by means of the control gear 28. The alternate supplying of the two fluids 32, 34 is maintained and preferably the alternate supplying of the two fluids 32, 34 can be adjusted at the inflow 16 of the container 14 such that the relative displacement equilibrium is maintained along the container 14. Applying this flow resistance disturbs the state of equilibrium shown in FIG. 2f creating a potential difference between the two delimiting end surfaces at each part where the first fluid 32, which is completely inside the container 14, will be relatively displaced where the end surface 36, situated closest to the outflow 18, will be found at a lower level than the end surface 38 which is situated closest to the inflow 16. In FIG. 2h-2j the flow resistance is further increased, which means that the difference in level between the two end surfaces 36, 38 will increase further creating a greater potential difference in energy states.

Figure 3:
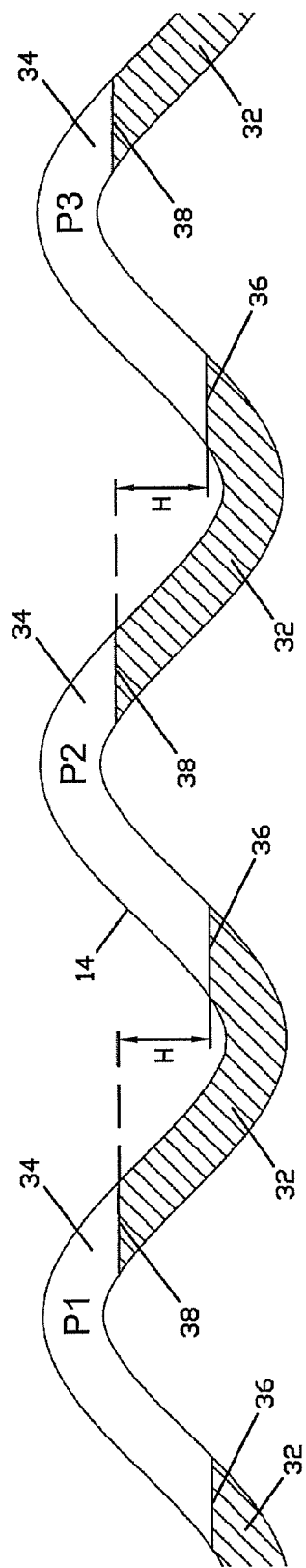
FIG. 3 shows an enlargement of the wave-power aggregate in the state shown in FIG. 2j.

FIG. 3 shows an enlargement of a part of the container 14 when it is in the position shown in FIG. 2j. Illustrated in FIG. 3, every part of the container 14 that is filled with the first fluid 32 is displaced such that the end surface 36 situated closest to the outflow 18 is found at a lower level than the end surface 38 situated closest to the inflow 16. This in turns results in the pressure at the first end surface 36, that is the one situated closest to the outflow 18, is being higher and thus possessing a higher potential energy (pressure) than the relative to the second end surface 38 respectively, that is, the one situated closest to the inflow 16. The pressure difference between the first and the second end surface 36, 38 corresponds to a fluid column of the first fluid 32 with a height H which is the same as the difference in level between the first and the second end surface 36, 38. This means that an increase of pressure takes place in the container 14 over every part with the first fluid 32 and thus the pressure P3 in the part with the second fluid 34 situated furthest to the right in FIG. 3 possessing higher pressure than the pressure P2 in the middle part with the second fluid 34 which in turn is higher than the pressure P1 in the part furthest to the left. Consequently an accumulated increase of pressure from the inflow 16 to the outflow 18 at container 14 is obtained and this increase of pressure can later be used to for example generate energy.

Thus the preferred embodiment of the method further comprises the step of utilizing the energy transferred from the wave motion to the container 14 in the form of an increase of pressure and/or a flow in at least one of the first and second fluids 32, 34 at the outflow 18 and/or the inflow 16. This utilization of the energy can be accomplished in a number of ways, which will be described below.

Figure 4:
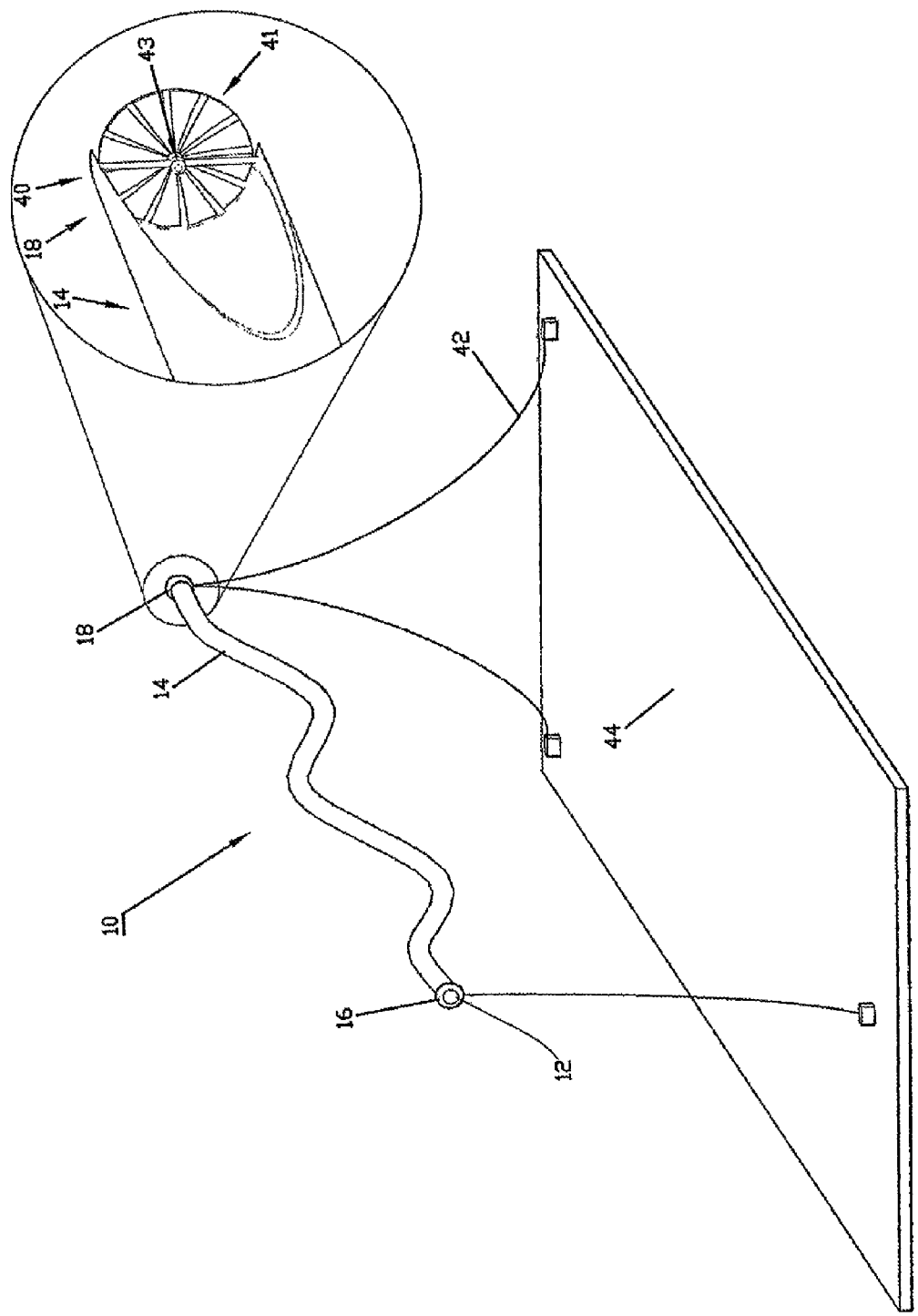
FIG. 4 shows a schematic side view of one embodiment of the wave-power aggregate according to the present invention.

FIG. 4 shows a preferred way of utilizing said energy, namely by arranging a conversion means 40 attached to the outflow 18 to convert an increase of pressure and/or flow in at least one of the first or second fluids 32, 34 into usable energy, preferably electrical energy. Thus at least one of the first or second fluids 32, 34 is carried through the conversion means 40 after having been pressurized during its journey through the container 14. To this end, in view of the conversion means 40, as shown in FIG. 4, one can preferably include a turbine 41 and also a generator 43 which is driven by the turbine 41. Consequently electrical energy can be generated when at least one of the pressurized first or second fluids 32, 34 is allowed to run through the turbine 41.

Further it is understood that the conversion means 40 can also be used as control gear 28, i.e., the conversion means 40 can be used to perform the control of the flow speed in at least one of the first or second fluids 32, 34 and/or regulation of the flow resistance through the container 14. In order to increase the flow speed the generator 43 could, for example, function as engine and the turbine 41 as pump.

Furthermore, FIG. 4 shows a preferred embodiment of the wave-power aggregate 10, namely that it includes anchorage means 42 adjusted to connect the wave-power aggregate 10 with at least one anchor point. In the embodiment shown in FIG. 4, the anchorage means 42 consists of three anchorage lines, of which one is connected to the inflow 16 and two to the outflow 18. Preferably, and as shown in FIG. 4, the anchorage means 42 are meant to connect the wave-power aggregate 10 with a bottom 44 which at least partially delimits the liquid 12 from which wave energy is extracted.

Figure 5:
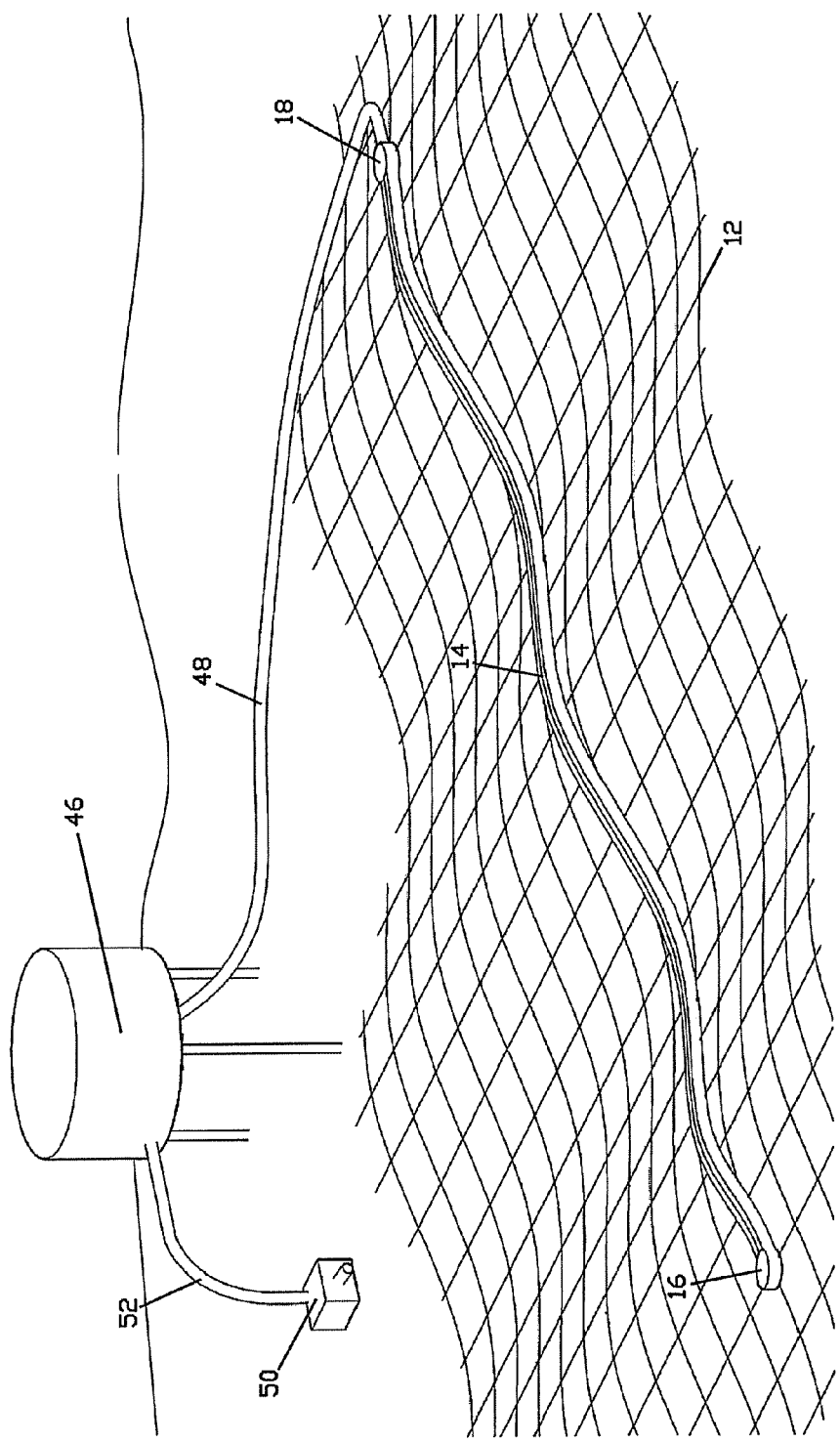
FIG. 5 shows a schematic side view of another embodiment of the wave-power aggregate according to the present invention.

The utilization of the energy can be done in a number of different ways, in one alternative shown in FIG. 5 it is done at least partially by transporting at least one of the first and second fluids 32, 34 to a reservoir 46 situated in a position with higher potential energy than the outflow 18. Consequently the outflow 18 can be in fluid communication with a reservoir 46, for example via a pipe 48 as shown in FIG. 5. At least one of the pressurized fluids 32, 34 can thus be pumped to the reservoir 46 and the increase of potential energy that is hereby obtained can be used at a later point of time, for example by letting the fluid or the fluids stored in the reservoir 46 be carried through a turbine 50 connected to a generator (not shown), where the turbine 50 is situated at a level with lower potential energy than the reservoir 46. The turbine 50 is, in the embodiment shown in FIG. 5, in fluid communication with the reservoir 46 through a second pipe 52. It is however of course also possible to fit the turbine 50 at the bottom of the reservoir 46.

If only one of the fluids is to be transported to the reservoir 46, a preferred embodiment of the method according to the present invention is preferably used, which includes a step of separating the first fluid 32 from the second fluid 34 when the fluids 32, 34 have been transported from the inflow 16 to the outflow 18. This separation takes place preferably by means of a fluid separator (not shown) which is in fluid communication with the outflow 18, said separator is arranged such as to separate at least the first and second fluids 32, 34.

A fluid separator can be designed in a number of different ways, which are known to those skilled in the art. A simple design of a fluid separator is a vessel (not shown) which is connected to the outflow 18. The vessel comprises two openings: one at the top and one at the bottom of the vessel. Because of the difference in density between the two fluids 32, 34 the first fluid 32 can exit through the opening at the bottom of the vessel and the second fluid 34 can be extracted from the opening at the top of the vessel.

It is understood that a separation of the fluids when they have passed through the container 14 can be desirable even if neither the first nor the second fluid 32, 34 is transported to the reservoir 46 but instead taken through the conversion means 40 described in relation to the embodiment shown in FIG. 4.

Figure 6:
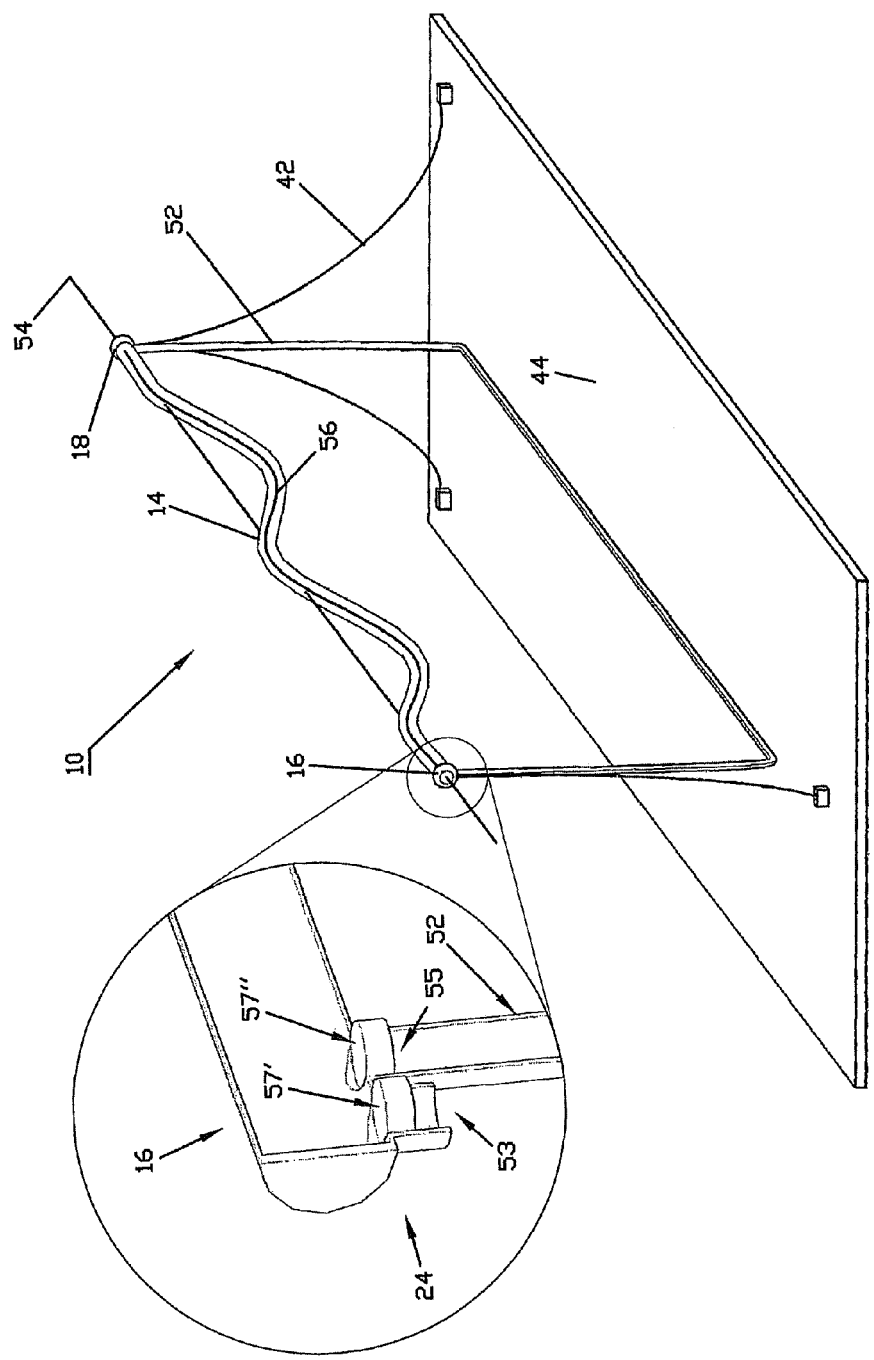
FIG. 6 shows a schematic side view of an additional embodiment of the wave-power aggregate according to the present invention.

An example of a situation when it can be desirable to separate the two fluids 32, 34 is shown in FIG. 6, which illustrates a preferred embodiment of the present invention which further comprises the step of returning the second fluid 34 from the outflow 18 to the inflow 16 after passing through the container 14. This return can be done in a number of ways, but FIG. 6 shows a preferred method of bringing back the second fluid 34 to the opening 16 where the wave-power aggregate 10 comprises a second fluid pipe 52 which connects the outflow 18 and the inflow 16 and the method further comprises the step of bringing back the second fluid 34 from the outflow 18 to the inflow 16 via the second fluid pipe 52. Thus second fluid 34 will be re-used and the need to re-supply the wave-power aggregate 10 with the second fluid 34 from an external source can thus be eliminated.

FIG. 6 further shows an alternative design of the container 14, namely that the container 14 is made of a rigid material. Preferably, the center of the cross-section of the inflow 16 and the outflow 18 is situated on an extension line 54, and the container 14 has a center line 56 which runs from the inflow 16 to the outflow 18 along the center of the cross-section of the container 14, where as the container 14 includes a part where the center line 56 is situated at a distance from the extension line 54. In the design of the container 14 shown in FIG. 6, the container 14 comprises a number of parts, by which the center line 56 is situated at a distance from the extension line 54, which is a preferred design of a rigid container 14 according to the present invention. When waves reach the container 14 shown in FIG. 6, the container 14 will, because of its design, rotate around essentially its extension line 54, which results in a change of the potential energy of every part of the container 14, which in turn creates conditions for transporting the fluids 32, 34 through the container. It is of course also possible to use a container 14 that comprises a number of rigid sections, which are mutually linked by joints in order to imitate the qualities of a flexible hose.

FIG. 6, furthermore shows a preferred design of the fluid supply means 24 which includes a first opening 53 towards the liquid 12 in which the wave-power aggregate 10 is situated in and also a second opening 55 which is connected to the second fluid pipe 52. At these openings 55 and 53 there are also valves 57', 57" fitted such as to regulate the supply of the fluids 32, 34 to the container 14. The valves 57', 57" can thus be opened and closed on regular intervals in order to supply the fluids 32, 34 to the container 14. The valve 57" which supplies the second fluid 34 does not have to be placed at the opening 55, but can be placed at a suitable position along the second fluid pipe 52, for example, by the outflow 18 of the container 14.

Being that the second fluid 34 in the embodiment shown in FIG. 6 comes from the outflow 18 of the container 14, it is consequently the fluid that has previously been described as being pressurized, which results in the second fluid 34 pushing aside the first fluid 32 when valve 57" is opened and consequently forms an area part in the container which only includes the second fluid 34. Thus, valve 57', regulating the supply of the first fluid 32, can in certain embodiments be redundant and be omitted. Furthermore the first fluid 32 can preferably be released to the liquid 12 when the first fluid 32 has been transferred from the inflow 16 to the outflow 18 of the container 14. In certain embodiments the second fluid 34 could be released into the surroundings when the second fluid 34 has passed through the container 14, for example in those cases when air is used as the second fluid 34. Consequently, in said cases, both the first fluid 32 and the second fluid 34 can be supplied from the surroundings by means of the fluid supply 24 to the container 14.

Figure 7:
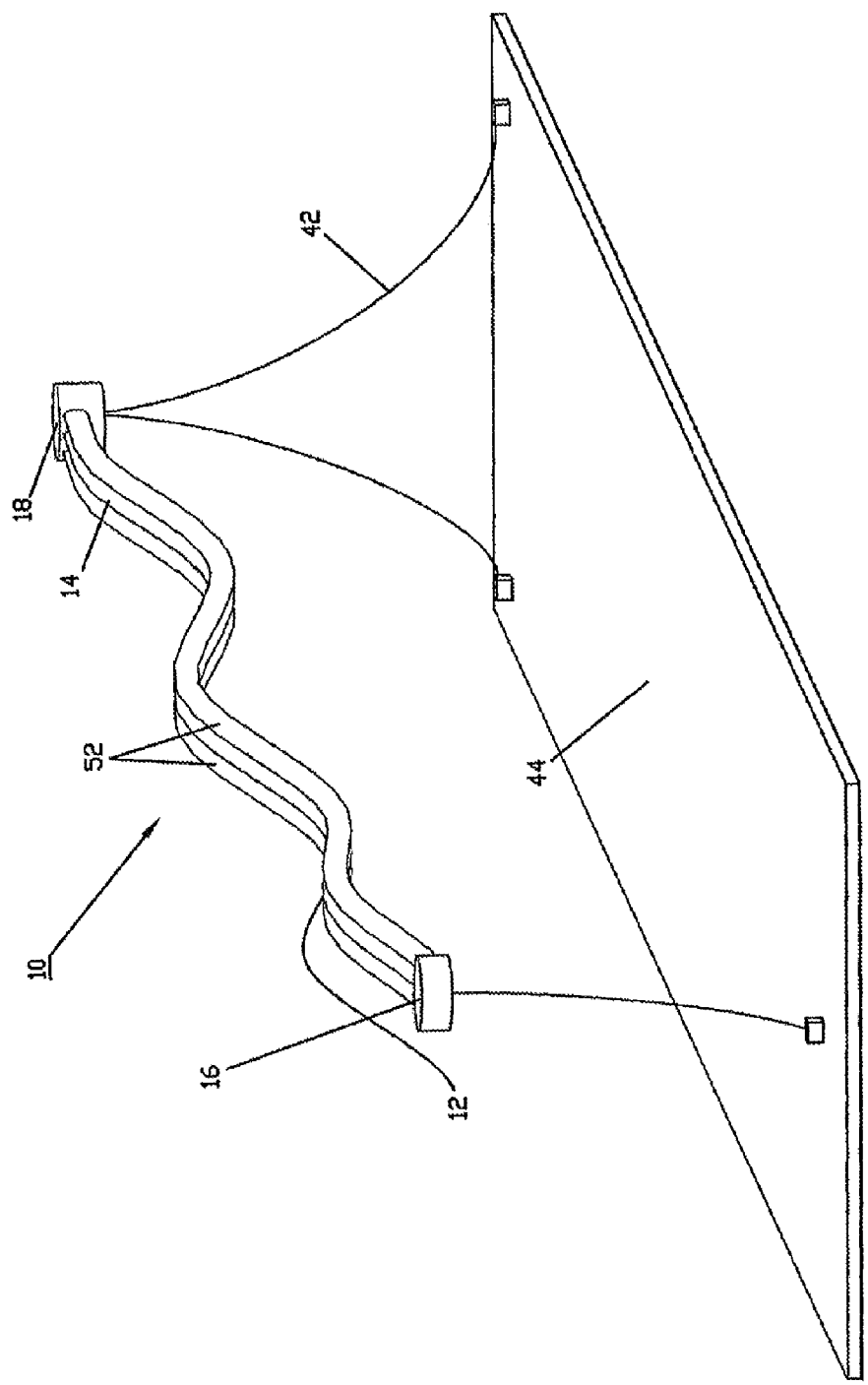
FIG. 7 shows a schematic side view of an additional embodiment of the wave-power aggregate according to the present invention.

The second fluid pipe 52 shown in FIG. 6 is situated partially at the bottom 44 which at least partially delimits the liquid 12, but in a preferred embodiment of the second fluid pipe 52, shown in FIG. 7, the second fluid pipe 52 is at least partially connected to the container 14. In the embodiment of the wave-power aggregate 10 shown in FIG. 7 the aggregate 10 comprises two continuous return fluid pipes 52, each of which is connected to the container 14.

In a preferred embodiment of the method according to the present invention, the density of the first fluid 32 is more than 10 times higher, preferably more than 100 times higher, and even exceeds 500 times higher, than the density of the second fluid 34. Preferably, the first fluid 32 is a liquid, preferably water, and the second fluid 34 a gas, preferably air.

Figure 8:
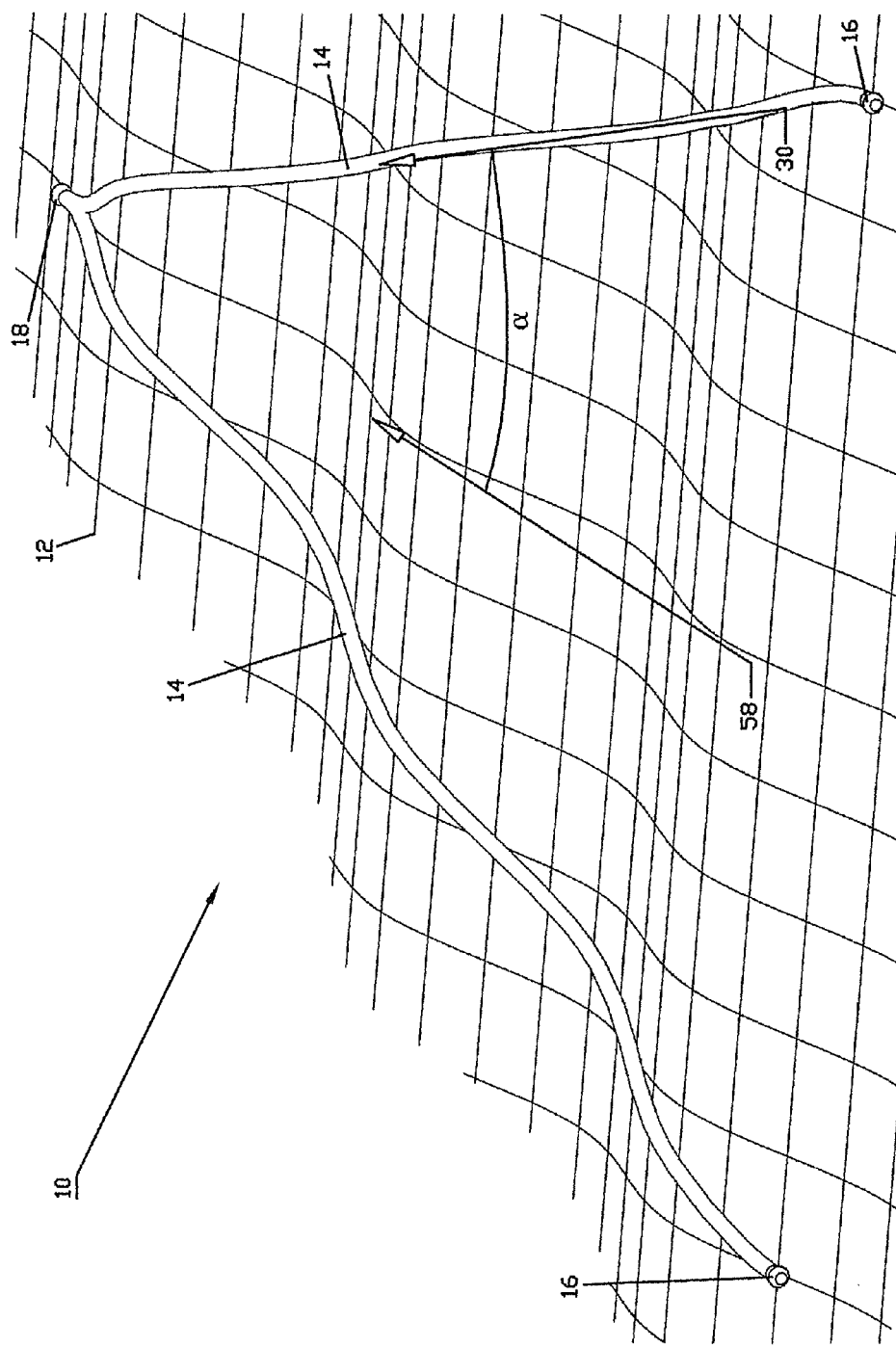
FIG. 8 shows a schematic side view of an additional embodiment of the wave-power aggregate according to the present invention.

FIG. 8 shows a preferred embodiment of the wave-power aggregate 10, where the aggregate 10 comprises a number of containers 14. In the example shown in FIG. 8 the aggregate 10 comprises two containers 14, each of which includes an inflow 16 and also a mutual outflow 18, where energy is extracted from each and every one of the containers 14, preferably at the outflow 18. In the embodiment shown in FIG. 8 the containers 14 are arranged to run essentially alongside each other. Of course it is also possible to arrange a number of containers 14 such that they run in succession each after the other such that the outflow 18 of one container 14 is connected to the inflow 16 of the following container 14. As shown in FIG. 8 every container 14 has an inflow 16 and also a mutual outflow 18, it should however be pointed out that this does not mean that they have to have separate inflows 16, outflows 18, fluid supply means 24 or conversion means 40.

FIG. 8 also illustrates another preferred embodiment of the present invention, namely that the extension direction 30 forms an angle α with the propagation direction 58 of the wave motion, whereas the method according to the present invention further comprises the step to set the angle α in order to affect the extraction of potential energy from the wave-power aggregate 10.

In order to further protect the wave-power aggregate 10 in for example extreme weather conditions, the aggregate 10 is preferably arranged to be able to be lowered, i.e. moved to a position where the aggregate is protected, when for example wave crests or wind speed exceed predetermined values. Thus when wave-induced loads are at their highest, at the water surface it is thus possible to essentially reduce the load on the aggregate 10.

Figure 9:
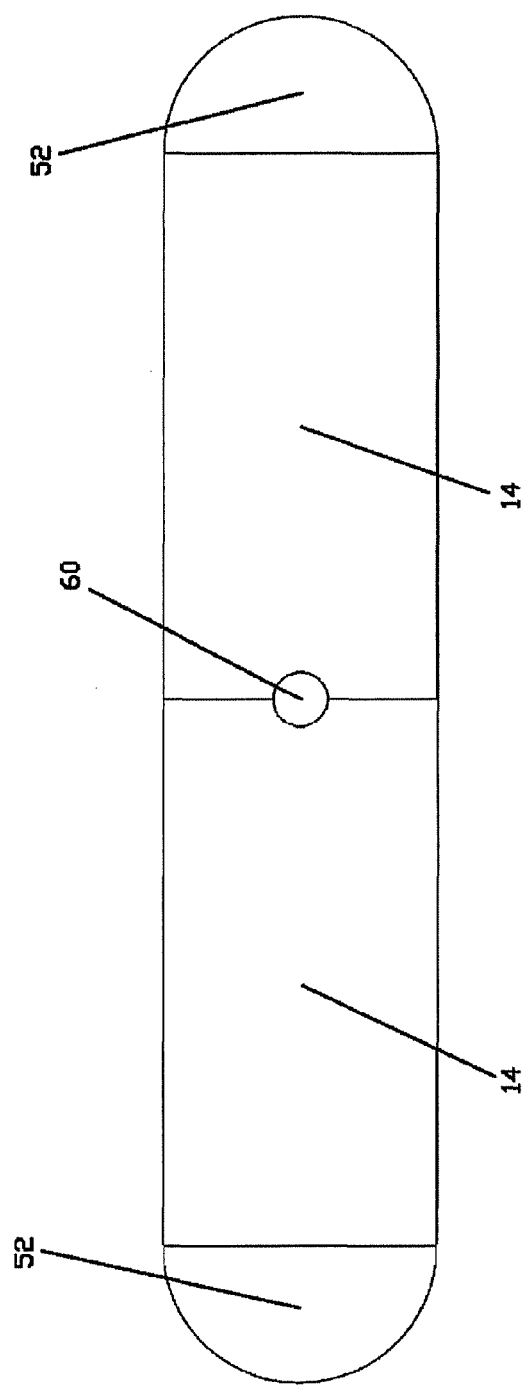
FIG. 9 shows a cross-section of a part of an embodiment of the wave-power aggregate according to the present invention.

When the pressure in the container increases in the extension direction 30 there is a risk that the fluids 32, 34 will be compressed. Especially in the embodiments of the present invention when the second fluid 34 is a gas, there exists a potential risk that the second fluid 34 is compressed in the container 14 as the pressure there increases. The result is that the parts with the second fluid 34 could lessen in extension, which can result in a falling off of the effect of the aggregate 10. In order to set this right a part of the aggregate 10 can be designed as shown in FIG. 9, where two containers 14 and two continuous return fluid pipes 52 are connected to each other. Between the two containers 14 an additional pipe 60 is arranged, by means of which an additional contribution of the second fluid 34 can be supplied to the containers 14 in the area between the inflows 16 and the outflows 18.

A number of additional solutions to the above mentioned problem are also possible, for example a narrowing container 14 in the extension direction 30 which at least partially could compensate for the compression of at least one of the fluids 32, 34.

Figure 10:
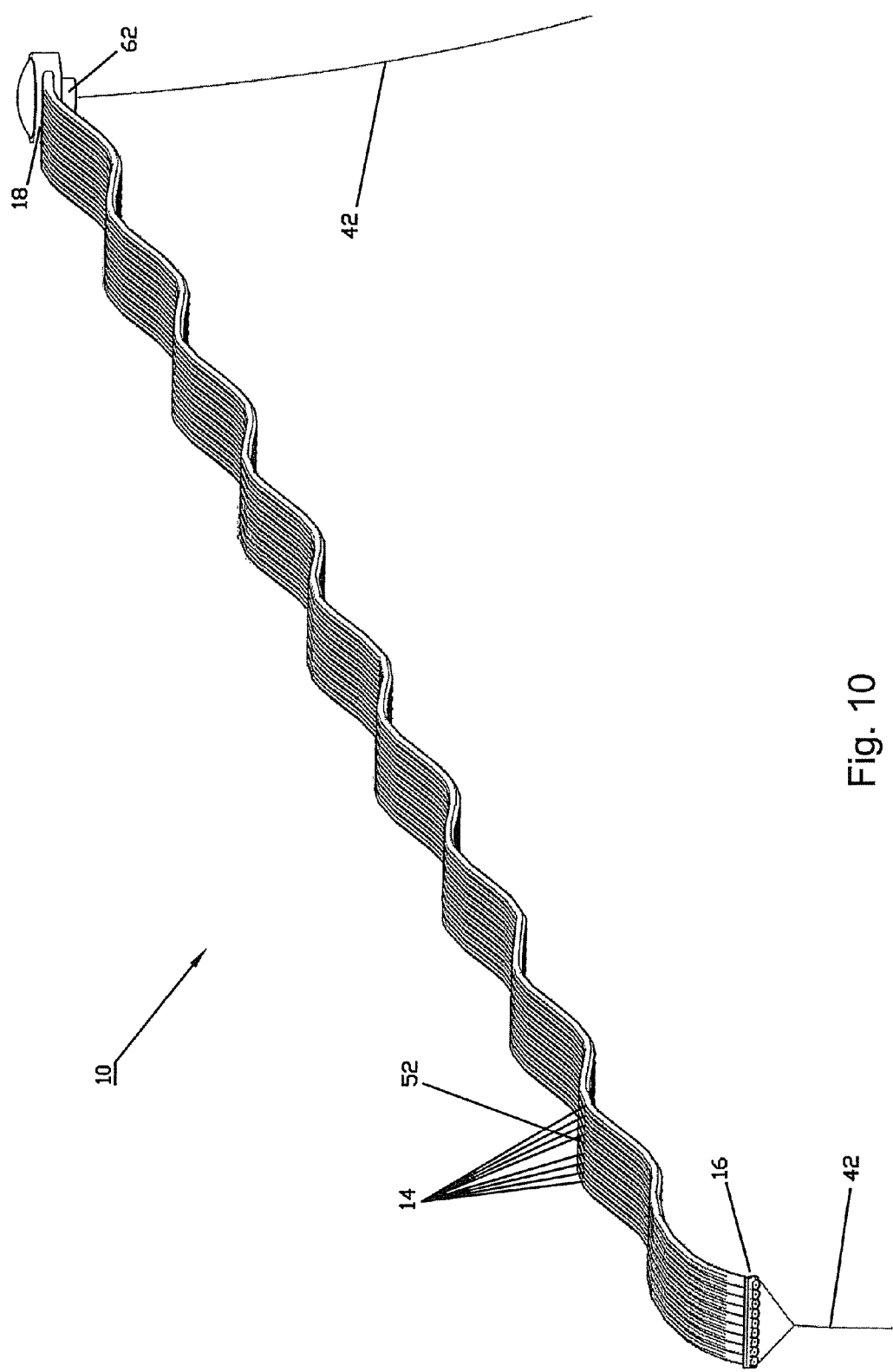
FIG. 10 shows an example of a wave-power aggregate according to the present invention.

Ultimately, an example of a wave-power aggregate according to the present invention will be shown in FIG. 10. It should be noted that this embodiment only serves as an example and that the included components and dimensions of these are only one of a number of possible combinations which all fall within the extent of protection of the accompanying claims.

The wave-power aggregate 10 in FIG. 10 is placed at sea and is arranged to there produce electricity by means of converting a flow and/or an increase of pressure through a turbine and a generator which are situated at the outflow 18. The first fluid 32 is in this case constituted by the sea water while the other fluid 34 is constituted by air. The wave-power aggregate 10 includes a number of hoses each of which in this example are 300 meters long. Each of the nine hoses has an inflow 16 and also an outflow 18. Eight of the hoses function as containers 14 while the ninth, in this example the one in the middle, functions as a continuous return fluid pipe 52. The hoses consist of flexible plastic and have a male radius of 220 mm and a thickness of 10 mm. By way of the anchorage means 42 the inflows 16 are placed below the surface of the water from which the wave energy is extracted. Further, the inflows 16 are constructed such that the hoses are in direct open fluid communication with the water from which the wave energy is extracted. The inflows 16 are supplied air via channels (not shown) to the containers 14. Said supply is controlled by valves (not shown) which are themselves controlled from a control unit placed by the outflows 18.

At said outflow(s) 18, the water and the air are separated. The air filling the upper parts at the outflow is now pressurized and re-circulated to the inflow 16 through the fluid pipe 52. The water that has been sucked in at the inflows 16 and that has moved through the containers 14, and been separated from the air at the outflow(s) 18 continues through a turbine with outflow 62 back into the ocean. The turbine is anchored to a generator and control unit placed at the upper part of the outflow(s) 18.

It should be noted that the present invention is in no way limited to the above mentioned embodiments, but can be varied freely within the frame of the following claims. For example, the wave-power aggregate 10 could be equipped with fins, floating pontoons, weights or similar means to, for example, influence the movement qualities of the aggregate 10. Furthermore, the energy can be utilized in a number of additional ways besides the ones shown in the description above, for example by means of at least one of the embodiments of the wave-power aggregate 10, pressurized fluids 32, 34 can be used to extract hydrogen from water, or alternatively to purify water from for example salt and/or polluted water.

The invention claimed is:

1. A method of extracting energy from wave motion in a single fluid (12), comprising:
   a. providing a wave power aggregate comprising at least one container (14) situated at least partially in said single fluid (12), the container (14) being designed to have the qualities of a flexible hose and being equipped with an inflow (16) and an outflow (18), wherein said container (14) has an extension in an extension direction (30) between said inflow (16) and said outflow (18), and wherein said container further comprises a first (20) and a second (22) part which when under the influence of said wave motion, the first part (20) of said container (14) arranges itself in a first position and the second part (22) of said container (14) arranges in a second position, and wherein said first and second positions correspond to different potential energy;
   b. alternately supplying to the container (14) at least a first and a second fluid (32, 34) via the inflow (16), where the density of said first fluid (32) differs from the density of said second fluid (34); and c. at least during an initial stage of said method, controlling a flow speed in said extension direction (30) in at least one of said first and second fluids (32, 34).

2. The method of claim 1, wherein the method further comprises the step of regulating a flow resistance for at least one of said first and second fluids (32, 34) in said container (14).

3. The method of claim 1, wherein the method further comprises the step of separating said first fluid (32) from said second fluid (34) when the fluids have been moved from said inflow (16) to said outflow (18), the method further comprising optionally returning said second fluid (34) from said outflow (18) to said inflow (16).

4. The method of claim 1, wherein said first fluid (32) is a liquid and said second fluid (34) is a gas.

5. The method of claim 1, wherein said extension direction (30) forms an angle ($\alpha$) with the direction of propagation (58) of said wave motion, where the method further comprises the step of setting said angle ($\alpha$) to influence the extraction of potential energy.

6. The method of claim 1, wherein said container (14) in an operational state is arranged at a first distance from the surface of said liquid from which the wave energy is extracted and the method further comprises the step of, when the wave height of said waves exceeds a predetermined value, moving said container (14) to a protection state, in which said container (14) is situated at a second distance from said surface which is larger than said first distance.

7. The method of claim 1, further comprising using a pump in order to increase the flow speed of at least one of said first and second liquids.

8. The method of claim 7, wherein a turbine (41) functions as the pump forming part of an energy conversion means (40) by using a generator (43) connected to the turbine (41) as an engine.

* * * * *